(12) United States Patent
Parks

(10) Patent No.: US 6,959,001 B1
(45) Date of Patent: Oct. 25, 2005

(54) METHOD AND APPARATUS FOR PROVIDING MULTI-SERVICE PACKAGE PRICED ACCORDING TO BANDWIDTH AND DISTANCE

(75) Inventor: William E. Parks, Frisco, TX (US)

(73) Assignee: Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/568,844

(22) Filed: May 11, 2000

(51) Int. Cl.[7] .......................... H04L 12/28; H04L 12/56
(52) U.S. Cl. ...................... 370/410; 370/352; 370/468; 370/395.2; 379/114.01; 379/114.07
(58) Field of Search .................. 370/252, 352–356, 370/389, 400, 401, 468, 410, 229, 230, 235, 370/236, 395.2, 395.21, 395.4, 395.41, 395.5; 379/114.02, 114.03, 114.07, 114.1, 112.08, 379/114.01, 114.28–115.03

(56) References Cited

U.S. PATENT DOCUMENTS

| | | | | |
|---|---|---|---|---|
| 4,122,308 A | * | 10/1978 | Weinberger et al. | ........ 379/131 |
| 5,553,131 A | * | 9/1996 | Minervino et al. | .... 379/114.01 |
| 5,757,784 A | | 5/1998 | Liebowitz et al. | .......... 370/321 |
| 5,828,468 A | * | 10/1998 | Lee et al. | .................... 358/434 |
| 5,832,069 A | * | 11/1998 | Waters et al. | .......... 379/115.01 |
| 5,970,130 A | * | 10/1999 | Katko | .................... 379/201.01 |
| 5,991,310 A | * | 11/1999 | Katko | ......................... 370/522 |
| 6,292,478 B1 | * | 9/2001 | Farris | ......................... 370/352 |
| 6,483,842 B1 | * | 11/2002 | Mauger | ...................... 370/420 |
| 6,640,242 B1 | * | 10/2003 | O'Neal et al. | .............. 709/206 |

FOREIGN PATENT DOCUMENTS

| | | | | |
|---|---|---|---|---|
| EP | 258654 | 3/1988 | ............ H04Q 3/66 |
| EP | 748557 | 11/1995 | .......... H04M 15/00 |

* cited by examiner

*Primary Examiner*—Ajit Patel
(74) *Attorney, Agent, or Firm*—Leonard C. Suchtya, Esq.; Joel Wall, Esq.; Rader, Fishman & Grauer PLLC

(57) ABSTRACT

The present invention provides a method and apparatus for providing telecommunications service to a customer while charging the customer based on one rate or tariff. The rate is set by the Telephone Company based on the distance between the endpoints of the services provided and the bandwidth specified by the customer for a particular end user. The customer simply chooses the type of handoff that it prefers for a protocol and the telecommunications company routes the data or telephone call in the most efficient means available while providing a throughput in accordance with the bandwidth that has been selected by the customer. Thus, using the method and apparatus of the current invention, the Telephone Company can take advantage of the parts of its infrastructure which are not currently being utilized efficiently in order to transport the data or voice call from the end user to the customer's point of presence.

24 Claims, 3 Drawing Sheets

METHOD AND APPARATUS FOR PROVIDING MULTI-SERVICE PACKAGE PRICED ACCORDING TO BANDWIDTH AND DISTANCE

BACKGROUND OF THE INVENTION

1. Technical Field

The present invention relates to telecommunications systems and more particularly to a method and system for charging for services based on the distance and bandwidth between two end points.

2. Description of the Related Art

Traditionally, telephone companies have charged end users of their services based on the type of service provided to the end user. Such a pricing system results in the need to develop pricing schemes (also called tariffs) for each individual type of service. In addition, it limits the type of service used to transport a particular call or data service to the method selected by the customer. Currently there are a vast number of communications services which may be used to transport data or telephone calls across a telecommunications network. These include ADSL, Frame Relay, P Modem and ATM to name a few. Because this great variety of communications services results in a very complex billing system, it would be desirable to simplify the telecommunications service provided to the customer. Thus, rather than having different pricing structures for the a various services, it would be preferable to have one rate or one pricing structure for each customer in order to avoid the necessity of a multi-tariff enrollment for the customers.

SUMMARY OF THE INVENTION

The present invention provides a method and apparatus for providing telecommunications services to a customer while charging the customer based on one rate or tariff. The rate is set by the Telephone Company based on the distance between the endpoints of the services provided and the bandwidth specified by the customer for a particular end user. The customer simply chooses the protocol that it prefers for a hand off and the Telephone Company routes the data or telephone call in the most efficient means available while providing a throughput in accordance with the bandwidth that has been selected by the customer. Thus, using the method and apparatus of the current invention, the Telephone Company can take advantage of the parts of its infrastructure which are not currently being utilized efficiently in order to transport the data or voice call from the end user to the customer's point of presence.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
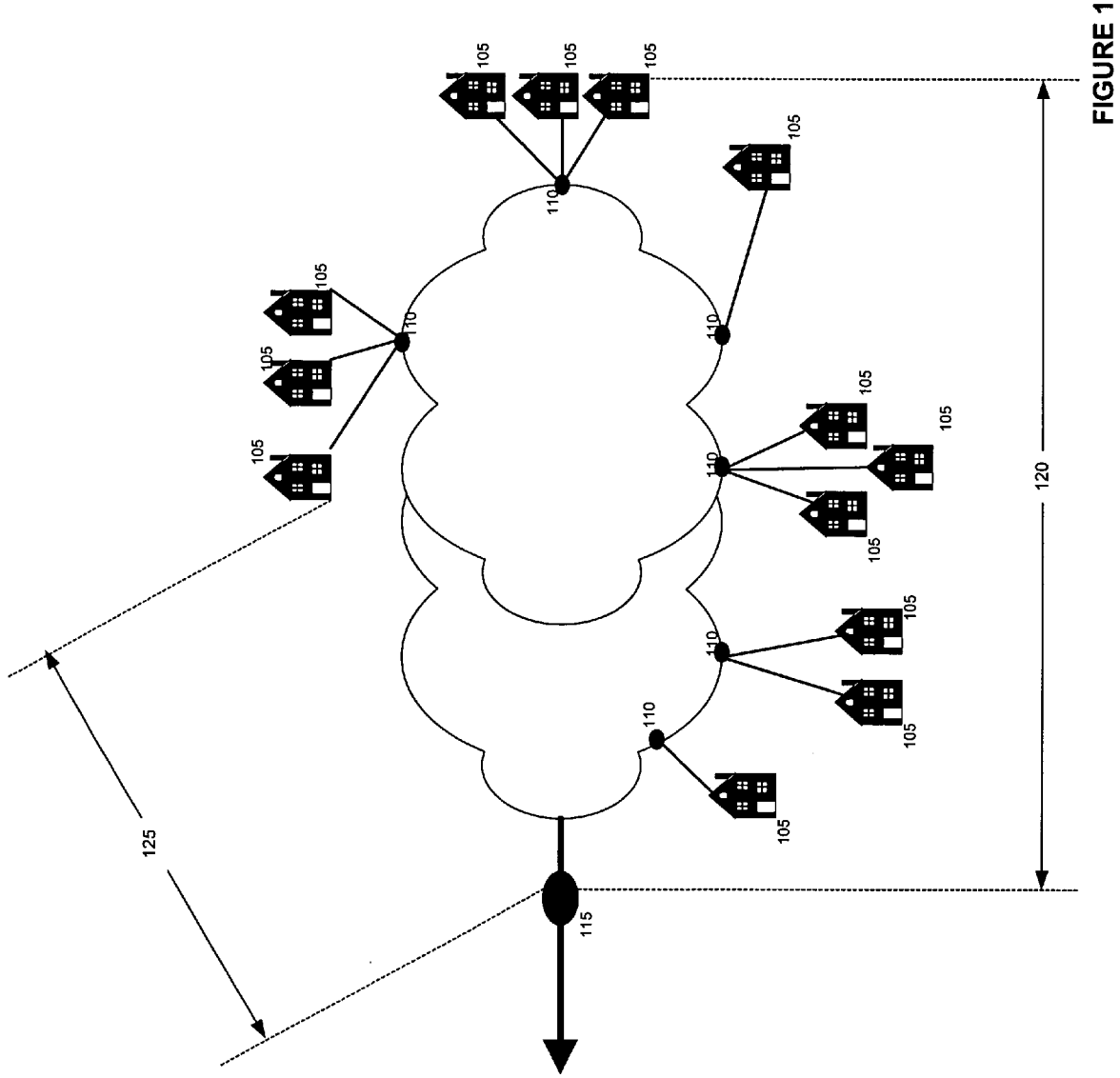
FIG. 1 is a schematic diagram of a preferred embodiment of the present invention.

Referring now to FIG. 1 a schematic diagram of a preferred embodiment of the present invention is illustrated. Numerous end users or subscribers of a customer are connected to various central offices within a LATA or even outside of the LATA. The end users 105 are connected to central offices 110 in a manner which is chosen by the Telephone Company. This connection may be a DSL connection, an ISDN line, a T-1 line, a T-3 line, a DS-0 line, a DS-1 line, a DS-3 line, Hibac, frame relay, ATM, or any other service which is currently used or may be used in the future to connect a end user to a central office. Although the Telephone Company may choose the type of connection that is made to the central office, this does not affect the price of the service to the wholesale customer who is paying for connecting the end user 105 to the customer's point of presence (POP) 115. A POP refers to the customer's equipment that is connected to the Telephone Company's central office and represents the point at which telephone and data calls are handed off between the Telephone Company and the customer. The price for connecting a end user 105 to the customer's point of presence 115 is determined based on the geographical distance between the end user 105 and the customer's point of presence 115. The distances between each of the end users and the point of presence 115 may be determined using Cilli Code as is well known in the art. When performing the distance calculation, the rate may be chosen based on ranges of distances. For example, for the range from 0–5 miles, one rate should be charged for a particular bandwidth and for a distance of 5–10 miles, a higher rate could be charged for the same bandwidth. However, one skilled in the art would understand that numerous methods of distance calculation of rates may be used.

For example, the distance 120 is calculated and used to determine the rate to charge a customer based upon the bandwidth desired to connect the particular end user to the customer's point of presence 115. Obviously, the distance 125 is shorter than the distance 120 and therefore the rate charged to connect the end user who is a distance 125 from the customer's point of presence would be less than the rate charged for the end user who is connected at a shorter distance 120 for the same bandwidth. The connection from the central office that connects each end user 105 to the customer's point of presence 115 is chosen by the Telephone Company and can include any number of telecommunications services that are available through the Telephone Company including Frame Relay, ATM, SONET, IP router, modems, plain old telephone lines, ISDN, T-1, T-3, DS-0, DS-1, DS-3 and other technology that may be developed in the future to transport either data or voice calls. The customer is oblivious to the method actually chosen by the Telephone Company because the same bandwidth of service is provided to the customer regardless of the type of service used to transport the data. The Telephone Company must only hand off the data in the protocol selected by the customer.

In a preferred embodiment, the Telephone Company assigns a unit price to each bandwidth that may be selected by the customer. When the distance calculation is formed using a plurality of distance ranges, the unit price for the bandwidth is simply multiplied by the distance range number in order to obtain the price for the service. The unit price can be based on a time interval, such as one month, or could also be based on the actual usage time of the service by the end user. In other words, if the end user does not utilize the service within a given month, then there is no charge for that particular end user. The service could also be set up in a manner in which the end user is provided with the selected bandwidth at all times so that the customer is billed a fixed fee each billing period. Thus, the unit price of a particular bandwidth is dependent upon the method that is used to bill the particular service whether it be a usage dependent fee or a fixed fee. Nevertheless, the spirit of the invention is the same regardless which of these methods is used. In an embodiment in which ranges of distances are used, the ranges may be numbered starting with the closest range and extending through the range with the greatest distance. Thus, in order to get the price for a particular service at a certain bandwidth, the unit price for the bandwidth is multiplied by the range number. If the charge for the service is dependent upon the time of actual use, then the result is multiplied by the time of actual use in order to arrive at the charge that is billed to the customer for that particular end user. This is done for all of the end users who are connected to the customer's point of presence and the sum of all of these charges is billed to the customer periodically.

Figure 2:
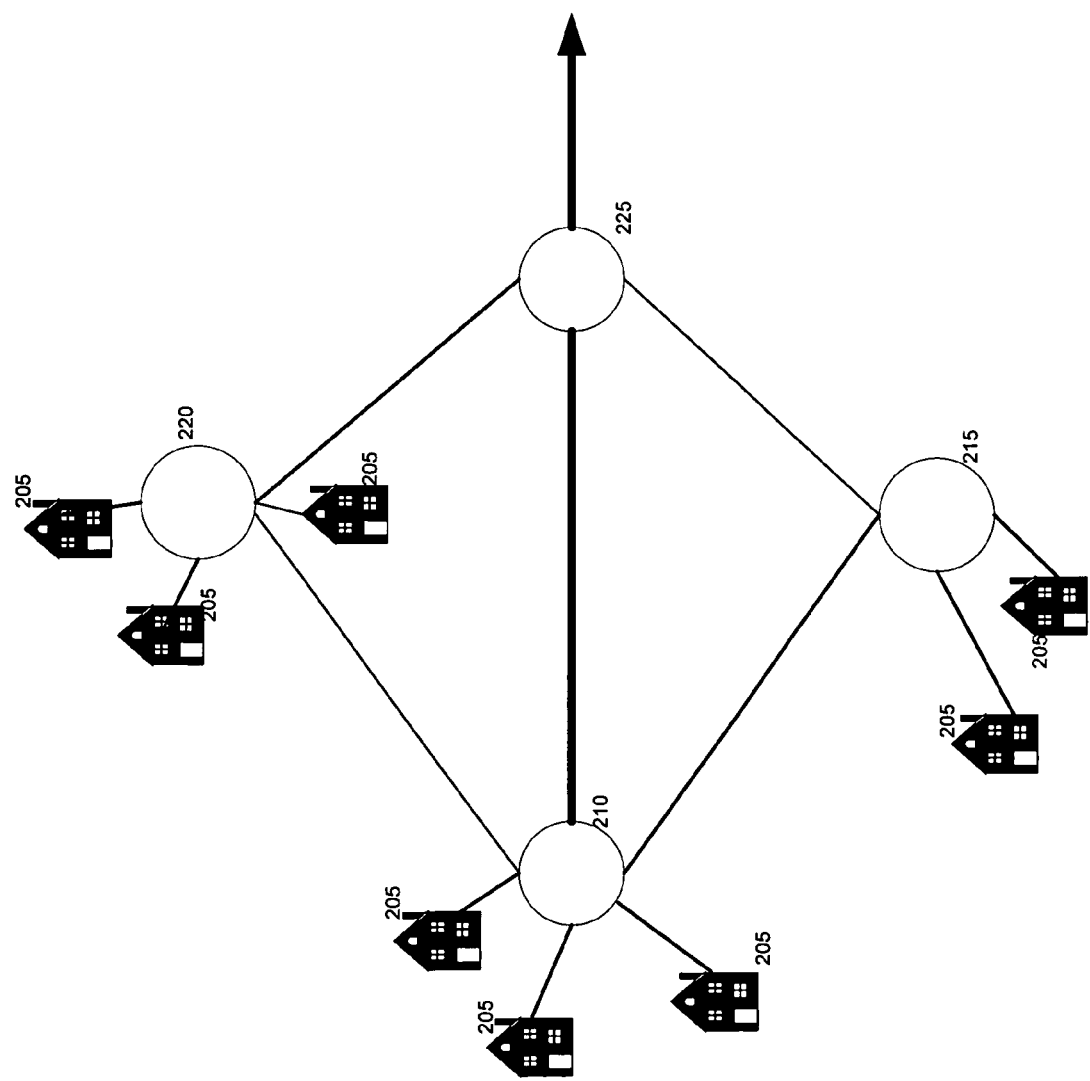
FIG. 2 is a schematic diagram of a preferred embodiment showing the central offices in greater detail.

Referring now to FIG. 2, a schematic diagram of a preferred embodiment showing the central offices in greater detail is illustrated. Numerous end users 205 who are typically subscribers of a customer are connected to various central offices 210, 215, 220. The customer has a point of presence at one central office 225 which is used to join all of the data transmissions or voice calls into one stream for transport over a large bandwidth connection to the customer. Again, the connection to the central offices may be made in any manner chosen by the Telephone Company so long as the connection provides at least the bandwidth that was chosen by the customer for each particular end user. Once the end user is connected to a central office, the data transmission or voice call is transported in the most efficient manner available for transportation of that particular voice or data transmission at the time that it is made. The method chosen will thus be dependent on the current call volume for each of the services and the relative expense to the Telephone Company in connecting the call through the various services.

Figure 3:
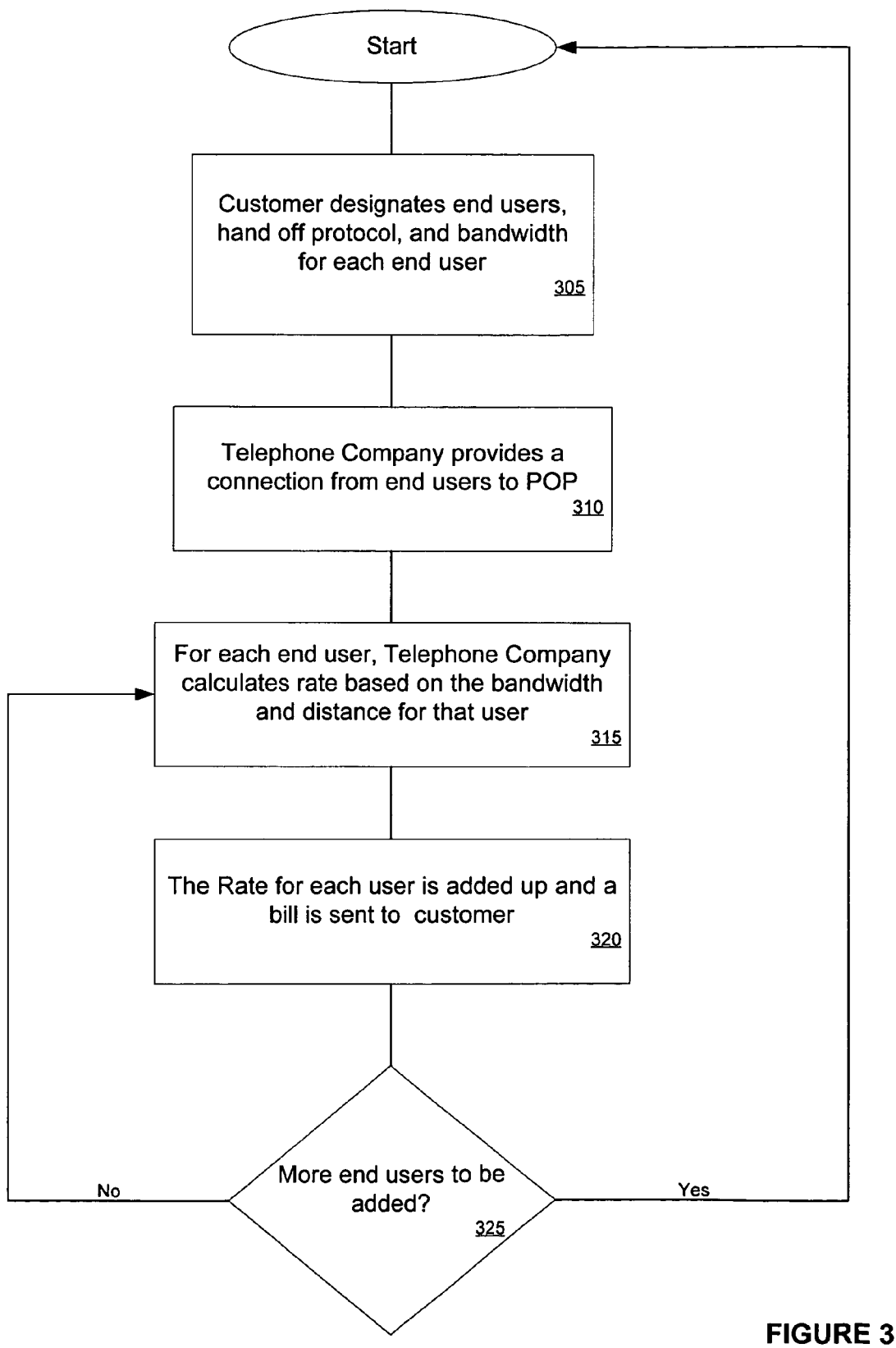
FIG. 3 is a flowchart of a preferred embodiment of the present invention.

Referring now to FIG. 3, a flowchart of a preferred embodiment of the present invention is illustrated. To initiate the process, a customer designates the end users, the handoff protocol for each end user, and a bandwidth for each end user (step 305). To begin the service the Telephone Company provides a connection from the end users to a point of presence of the customer (step 310). The connection chosen must be in accordance with the bandwidth designated by that customer for that particular end user. Obviously, the customer is not allowed to choose a bandwidth for an end user where services are not available to support that bandwidth. In other words, the bandwidth is limited to the services that are available in that particular market area. For each end user, the Telephone Company then calculates the rate based on the bandwidth and the distance for that particular end user as described above (step 315). The rate charged for each end user is then added up and a bill is sent to the customer, typically on a monthly basis (step 320). At any time during the service provided to the customer, the customer may decide to add additional end users. If additional end users are desired (step 325), then the customer again designates the end user(s) to be added as well as the handoff protocol and the bandwidth for each end user(s) (step 305), and the Telephone Company then provides a connection for the additional end users to the customer's point of presence (step 310).

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed:

1. A method for providing a multi-service telecommunications and billing package comprising the following steps:
   a) selecting a bandwidth of service to be provided between said end user and said point of presence;
   b) dynamically selecting a service from a plurality of available services based on said bandwidth of service and actual traffic volume for each of said available services in said plurality;
   c) using said selected service to provide a connection between said end user and said point of presence;
   d) determining a distance between said end user and said point of presence; and
   e) billing said customer for said connection wherein a billing rate for said connection is based on said bandwidth and said distance.

2. The method of claim 1 wherein said billing rate is proportional to said bandwidth and said distance.

3. The method of claim 1 wherein said billing rate is based on a one of a plurality of ranges of distance corresponding to said distance.

4. The method of claim 3 wherein said billing rate is a first rate when said distance is within a first of said plurality of ranges.

5. The method of claim 4 wherein said billing rate is a second rate when said distance is within a second of said plurality of ranges.

6. The method of claim 1 wherein said plurality of available services consists of at least a subset of asynchronous transfer mode, digital network, synchronous optical network, T-1, T-3, DS-0, DS-1, DS-3, wireless, plain old telephone lines, cellular, cable TV, and personal communications services.

7. The method of claim 1 wherein said selected service provides an actual bandwidth between said end user and said point of presence, said actual bandwidth being at least as great as said bandwidth of service.

8. The method of claim 1 wherein said end user comprises a plurality of end users wherein said customer is billed for each of a plurality of connections to said plurality of end users such that a billing rate for a connection to a one of the plurality of end users is based on a bandwidth of a service provided to said one of the plurality of end users and a distance between said one of the plurality of end users and said point of presence.

9. A method for providing a multi-service telecommunications billing package comprising the following steps:
   a) selecting a bandwidth of service to be provided between said end user and said point of presence:
   b) providing a connection between said end user and said point of presence based on said bandwidth of service:
   c) determining a distance between said end user and said point of presence: and
   d) billing said customer for said connection wherein a billing rate for said connection is based on said bandwidth and said distance, said step of billing said customer comprising:

storing a plurality of distance ranges and a plurality of distance factors wherein said plurality of distance ranges correspond to said plurality of distance factors;

storing a plurality of bandwidth values and a plurality of bandwidth factors wherein said plurality of bandwidth values corresponds to said plurality of bandwidth factors;

retrieving a distance factor for said end user corresponding to a one of the plurality of distance ranges within which said distance is located;

retrieving a bandwidth factor for said end user corresponding to a one of the plurality of bandwidth values corresponding to said bandwidth; and multiplying said distance factor for said end user and said bandwidth factor for said end user to determine said billing rate.

10. A method for charging a customer of a multi-service telecommunication package comprising the following steps:

locating a first end user at a first location connecting the first location of the end user to a customer's central office connected to a point of presence of a second location:

determining a distance between said first location and said second location:

determining a bandwidth of the connection:

calculating a price for the connection using said distance and said bandwidth: and billing the customer:

wherein said step of calculating said price comprises the steps of:

converting said distance into a distance factor;

retrieving a unit price for said bandwidth from a predetermined array of unit prices; and multiplying said distance factor by said unit price.

11. The method of claim 10 wherein said distance factor is a distance range number chosen from a plurality of distance range numbers based on said distance.

12. An apparatus for providing a multi-service telecommunications package, for connecting an end user to a point of presence of a customer, said apparatus comprising:

a) means for dynamically selecting a service from a plurality of available services based on a bandwidth of service selected by said customer and actual traffic volume for each of said available services in said plurality;

b) means for providing a connection between said end user and said point of presence based on said selected service;

c) means for determining a distance between said end user and said point of presence; and d) means for billing said customer for said connection wherein a billing rate for said connection is based on said bandwidth and said distance.

13. The apparatus of claim 12 wherein said plurality of available services consists of at least a subset of asynchronous transfer mode, digital subscriber line, frame relay, internet protocol router modem, integrated services digital network, synchronous optical network, T-1, T-3, DS-0, DS-1, DS-3, wireless, plain old telephone lines, cellular, cable TV, and personal communications services.

14. The apparatus of claim 12 wherein said means for determining comprises a data processing system.

15. An apparatus for providing a multi-service telecommunications package for connecting an end user to a point of presence of a customer, said apparatus comprising:

a) means for providing a connection between said end user and said point of presence based on a bandwidth of service selected by said customer;

b) means for determining a distance between said end user and said point of presence: and c) means for billing said customer for said connection wherein a billing rate for said connection is based on said bandwidth and said distance, said means for billing comprising a data processing system wherein said billing rate is determined by retrieving a first value for a bandwidth of said connection and multiplying said first value by a factor derived from said means for determining said distance.

16. An apparatus for providing a multi-service telecommunications package for connecting an end user to a point of presence of a customer, said apparatus comprising:

a) means for providing a connection between said end user and said point of presence based on a bandwidth of service selected by said customer;

b) means for determining a distance between said end user and said point of presence-and c) means for billing said customer for said connection wherein a billing rate for said connection is based on said bandwidth and said distance, said means for billing including a data processing system comprising:

means for storing a plurality of distance ranges wherein each of said plurality of distance ranges corresponds to a distance factor;

means for storing a plurality of bandwidth values wherein each of said plurality of bandwidth values corresponds to a bandwidth factor;

means for retrieving a distance factor for said end user from said means for storing a plurality of distance ranges;

means for retrieving a bandwidth factor for said end user from said means for storing a plurality of bandwidth values; and means for multiplying said distance factor for said end user and said bandwidth factor for said end user to determine said billing rate.

17. The apparatus of claim 12 wherein said selected service provides an actual bandwidth between said end user and said customer, said actual bandwidth being at least as great as said bandwidth of service.

18. A computer program product in a computer readable medium for billing a customer based on a bandwidth and distance for a connection provided between an end user and a point of presence, the computer program product comprising:

a) first instructions for determining a distance between said end user and said point of presence;

b) second instructions for determining a bandwidth for said connection:

c) third instructions for billing said customer for said connection wherein a billing rate for said connection is based on said bandwidth and said distance, d) fourth instructions for storing a plurality of distance ranges wherein said plurality of distance ranges correspond to a plurality of distance factors;

e) fifth instructions for storing a plurality of bandwidth values wherein said plurality of bandwidth values correspond to a plurality of bandwidth factors;

f) sixth instructions for retrieving a distance factor for said end user from said means for storing a plurality of distance ranges;

g) seventh instructions for retrieving a bandwidth factor for said end user from said means for storing a plurality of bandwidth values; and h) eighth instructions for multiplying said distance factor for said end user and said bandwidth factor for said end user to determine said billing rate.

19. The method of claim 1 further comprising the step of joining data or voice transmissions of at least two central offices at the point of presence for multiple end users subscribing to one of the at least two central offices.

20. The method of claim 10 further comprising the step of joining data or voice transmissions of at least two customer central offices at the point of presence for multiple end users subscribing to one of the at least two customer central offices.

21. The apparatus of claim 12 wherein the point of presence joins data or voice transmissions of at least two central offices for multiple end users subscribing to one of the at least two central offices.

22. The computer program product of claim 18 wherein the program is further directed to join data or voice transmissions of at least two central offices at the point of presence for multiple end users subscribing to one of the at least two central offices.

23. The method of claim 1 wherein said step of selecting said service from said plurality of available services is based on expenses associated with each of said available services in said plurality for providing said connection.

24. The method of claim 12 wherein said means for dynamically selecting said service is configured to factor into said selection expenses associated with each of said available services in said plurality for providing said connection.

\* \* \* \* \*